US010932164B2

(12) United States Patent
Arora et al.

(10) Patent No.: US 10,932,164 B2
(45) Date of Patent: Feb. 23, 2021

(54) CDMA/EVDO VIRTUALIZATION

(71) Applicant: Parallel Wireless, Inc., Nashua, NH (US)

(72) Inventors: Jitender Arora, Westford, MA (US); Kaitki Agarwal, Westford, MA (US); Rajesh Kumar Mishra, Westford, MA (US); Arun Seshadri, Nashua, NH (US)

(73) Assignee: Parallel Wireless, Inc., Nashua, NH (US)

( * ) Notice: Subject to any disclaimer, the term of this patent is extended or adjusted under 35 U.S.C. 154(b) by 81 days.

(21) Appl. No.: 15/883,083

(22) Filed: Jan. 29, 2018

(65) Prior Publication Data

US 2018/0220339 A1    Aug. 2, 2018

Related U.S. Application Data

(60) Provisional application No. 62/451,333, filed on Jan. 27, 2017.

(51) Int. Cl.
| | |
|---|---|
| *H04W 76/16* | (2018.01) |
| *H04W 88/16* | (2009.01) |
| *H04W 92/02* | (2009.01) |
| *H04W 36/00* | (2009.01) |
| *H04B 7/26* | (2006.01) |

(52) U.S. Cl.
CPC ...... *H04W 36/0022* (2013.01); *H04B 7/2628* (2013.01); *H04W 88/16* (2013.01); *H04W 92/02* (2013.01)

(58) Field of Classification Search
None
See application file for complete search history.

(56) References Cited

U.S. PATENT DOCUMENTS

| | | | |
|---|---|---|---|
| 8,204,022 B2 * | 6/2012 | Lassers | H04W 88/181 370/331 |
| 8,477,621 B2 * | 7/2013 | Janakiraman | H04L 41/12 370/235 |
| 9,345,060 B1 * | 5/2016 | Ramamurthy | H04W 76/16 |
| 9,742,535 B2 | 8/2017 | Lorca Hernando | |

(Continued)

*Primary Examiner* — Duc T Duong
(74) *Attorney, Agent, or Firm* — Michael Y. Saji; David W. Rouille

(57) ABSTRACT

Systems and methods are disclosed for a CDMA base station management gateway for integrating CDMA into an LTE Evolved Packet Core (EPC) core network. In one embodiment, a system is disclosed, comprising: a base station management gateway situated between a code division multiple access (CDMA) base transceiver station (BTS) and an Evolved Packet Core (EPC) core network, the base station management gateway also situated between an additional base station and the EPC core network, the base station management gateway The method may further comprise: a stateful interworking proxy configured to perform interworking of CDMA signaling to Evolved Universal Mobile Telecommunications System Terrestrial Radio Access (EUTRAN) signaling by using an S2a/S2b interface toward the EPC and an A10/A11 interface towards the CDMA BTS; and a packet routing virtual function configured to enable mobile devices attached to the CDMA BTS to obtain IP connectivity via the EPC core network.

12 Claims, 11 Drawing Sheets

(56) References Cited

U.S. PATENT DOCUMENTS

| | | | |
|---|---|---|---|
| 2002/0061756 A1* | 5/2002 | Bleckert | H04W 68/12 455/458 |
| 2002/0193139 A1 | 12/2002 | Mildh et al. | |
| 2004/0082328 A1 | 4/2004 | Japenga et al. | |
| 2005/0088999 A1* | 4/2005 | Waylett | H04W 88/10 370/338 |
| 2007/0117561 A1* | 5/2007 | Shu | H04W 8/26 455/428 |
| 2008/0096547 A1* | 4/2008 | Zhang | H04W 24/04 455/424 |
| 2008/0259909 A1* | 10/2008 | Runeson | H04L 65/1006 370/352 |
| 2008/0316976 A1 | 12/2008 | Thompson et al. | |
| 2010/0130205 A1 | 5/2010 | Jung et al. | |
| 2010/0235890 A1* | 9/2010 | Cakulev | H04W 12/06 726/5 |
| 2010/0311416 A1* | 12/2010 | Abichandani | H04W 12/06 455/426.1 |
| 2011/0051683 A1* | 3/2011 | Ramankutty | H04W 36/0033 370/331 |
| 2011/0242975 A1* | 10/2011 | Zhao | H04L 29/12216 370/230 |
| 2012/0063414 A1* | 3/2012 | Ramachandran | H04W 36/0022 370/331 |
| 2012/0124229 A1* | 5/2012 | Sahu | H04W 76/10 709/228 |
| 2012/0300639 A1* | 11/2012 | Janakiraman | H04L 41/12 370/241 |
| 2013/0329567 A1 | 12/2013 | Mathias et al. | |
| 2014/0064156 A1 | 3/2014 | Paladugu et al. | |
| 2014/0080447 A1* | 3/2014 | Janakiraman | H04W 24/08 455/411 |
| 2014/0376563 A1* | 12/2014 | Suryavanshi | H04W 28/02 370/412 |
| 2015/0098391 A1* | 4/2015 | Sridhar | H04W 36/0022 370/329 |
| 2016/0014828 A1* | 1/2016 | Singh | H04W 12/08 370/329 |
| 2017/0086090 A1* | 3/2017 | Sharma | H04L 65/403 |
| 2017/0150332 A1* | 5/2017 | Palanisamy | H04W 4/70 |
| 2017/0265058 A1* | 9/2017 | Sahu | H04W 76/16 |

\* cited by examiner

CDMA/EVDO VIRTUALIZATION

CROSS-REFERENCE TO RELATED APPLICATIONS

This application is a non-provisional conversion of, and claims the benefit of priority under 35 U.S.C. § 119(e) to, U.S. Provisional Patent Application No. 62/451,333, filed Jan. 27, 2017 and titled "CDMA/EVDO Virtualization," which is hereby incorporated by reference in its entirety for all purposes. Additionally, U.S. Pat. App. Pub. Nos. US20150257051, US20140086120, US20140092765, US20140133456, US20140233412, US20150045063, US20150078167, US20150173111, US20160135132, and US20170273134A1 are hereby incorporated by reference in their entirety for all purposes.

BACKGROUND

In recent times, the prevalence and popularity of Internet Protocol (IP)-based systems has given rise to a new network architecture, Long Term Evolution (LTE), that provides voice and data services over IP. However, there is a need to provide legacy services, such as CDMA/EVDO services, over IP in a way that is compatible with the new IP-based hardware and software stack. Currently, CDMA/EVDO services are provided to legacy subscribers by simply maintaining the original CDMA/EVDO infrastructure at the telecom provider's back office. This results in various complications and problems, such as: difficult interworkings between legacy services and present-generation services; maintenance costs for old hardware and software, including power and air conditioning costs; and expensive service agreements on old hardware and software.

A need therefore exists to eliminate dependency on legacy hardware and software, while still providing the legacy CDMA/EVDO (Evolution Data Optimized)/EVDV (Evolution Data Voice) services. The present disclosure presents a way to meet this need.

SUMMARY

In some embodiments, a network node, called the HNG (Parallel Wireless HetNet Gateway) and situated between the radio access network (RAN) and the core network, is interposed. This network node performs interworking or translation so as to create a call in the IMS Core. The HNG provides/performs the functions of a traditional MSC toward the RAN, and towards the core provides a SIP proxy/SIP messaging function, so that LTE or IMS voice or data can be provided. Also, when a mobile device registers, this can be updated in IMS core so that incoming call (call termination) can happen and paging procedure initiated.

In a first embodiment, a system may be disclosed, comprising: a base station management gateway situated between a code division multiple access (CDMA) base transceiver station (BTS) and an Evolved Packet Core (EPC) core network, the base station management gateway also situated between an additional base station and the EPC core network, the base station management gateway The method may further comprise: a stateful interworking proxy configured to perform interworking of CDMA signaling to Evolved Universal Mobile Telecommunications System Terrestrial Radio Access (EUTRAN) signaling by using an S2a/S2b interface toward the EPC and an A10/A11 interface towards the CDMA BTS; and a packet routing virtual function configured to enable mobile devices attached to the CDMA BTS to obtain IP connectivity via the EPC core network by providing a packet data serving node (PDSN) interface to the CDMA BTS, and configured to also enable mobile devices attached to the additional base station to obtain IP connectivity via the EPC core network, the packet routing virtual function in communication with the stateful interworking proxy, and the stateful interworking proxy and the packet routing virtual function may be configured to interwork CDMA protocols to Long Term Evolution (LTE) protocols for communicating with and requesting resources from the EPC core network.

As used herein, CDMA may be one or more of cdmaOne/IS-95, cdma2000, evolution data optimized (EVDO), evolution data and voice (EVDV), or Ultra Mobile Broadband. The base station management gateway may be further configured to communicate via a P1 interface towards an authentication, authorization, and accounting (AAA) server, and a P-H interface toward a home agent or home AAA server, on behalf of the mobile devices attached to the CDMA BTS. The packet routing virtual function may be configured to terminate point-to-point (PPP) sessions with mobile devices attached to the CDMA BTS. The packet routing virtual function may be configured to act as a mobile IP foreign agent for mobile devices attached to the CDMA BTS. The base station management gateway further comprises a base station controller (BSC) and packet mobile switching center (MSC) virtual function.

The base station management gateway further comprises a Session Initiation Protocol (SIP) proxy for connecting SIP protocol voice connections. The SIP proxy acts as a SIP user agent (UA) on behalf of mobile users, performs SIP signaling towards an IP Mobility Subsystem (IMS) core network within the EPC core network, and performs interworking between CDMA and SIP signaling protocols.

The base station management gateway may be configured to interact with the additional base station as a home nodeB gateway (HNBGW). The base station management gateway may be configured to terminate an encrypted connection with a CDMA mobile device, thereby providing a secure anchor point for the CDMA mobile device for connection to the EPC core network. The base station management gateway may be a virtualization gateway providing virtualization by using a single identifier towards the EPC core network for a plurality of eNodeBs, home NodeBs, or CDMA BTSes. The base station management gateway may be configured to perform inter-radio access technology steering of a session from a first radio access technology (RAT) to a second RAT, the first RAT being CDMA and the second RAT being one of 2G, 3G, 4G, 5G, and wireless local area networking (WLAN). The base station management gateway may be configured to provide one or more application-aware inter-radio access technology (inter-RAT) slices across CDMA, 3G, 4G, 5G, and wireless local area networking (WLAN) technologies, the inter-RAT slices being based on application-layer information gathered at the base station management gateway. The base station management gateway may be configured to provide handovers between the CDMA BTS and one or more of a 2G base station, a 3G base station, a 4G base station, a 5G base station, and a Wi-Fi access point.

This application would provide services for both data and voice, for both control plane and user plane, for both circuit switched and packet switched services, in some embodiments. CDMA2000 service could also be provided, in some embodiments, in a similar fashion. In some embodiments, the MSC could be a self-contained module, an inter-dependent module within HNG, or a separate VM, for example. In some embodiments, multiple MSC virtualization may be provided.

DETAILED DESCRIPTION

As described above, there is a need to virtualize the CDMA/EVDO core network (henceforth called the CDMA core network). By enabling the CDMA core network to be run on a modern software architecture, it becomes possible to use virtual machines, such as those offered by VMWare, Docker, etc., managed using industry-standard methods for managing virtual machines, as well as high-performance scalable commodity hardware, to reduce costs and improve capex and opex for telecom operators.

An architecture is described to enable virtualization of CDMA/EVDO core network nodes using the Parallel Wireless HetNet Gateway [HNG], or another similar node. The Parallel Wireless HNG is a network node that sits between the radio access network (RAN) and the core network. This virtualization gateway enables the details of particular network nodes to be hidden or suppressed. For example, a plurality of RAN nodes may be managed by the virtualization gateway such that it is treated as a single RAN node by the core network (e.g., for MME mobility management and handover purposes), while the RAN nodes themselves also benefit by reduced signaling among RAN nodes (e.g., X2 coordination between nodes). As well, virtualization may be performed in the other direction, from the core network to the RAN, such that multiple core networks can be accessed without the RAN nodes being required to manage multiple core networks.

As used herein, in some instances, virtualization is understood to mean the use of an aggregator proxy, such that the aggregator represents a plurality of nodes as a single node. For example, multiple base stations may be represented as a single base station, or multiple core networks may be represented as a single core network. This allows for flexibly allowing a particular base station to be connected to a particular core network, even when the number of base stations and core networks is large, or in flux. This also allows for enabling heterogeneous networks to talk to each other by the use of interworking at the aggregator node. In some embodiments, this is as simple as IP Network Address Translation (NAT); in other embodiments this also includes the use of stateful proxies to set up communications with the core network, for example, to enable a mobile device to attach to the core network, while hiding the specific identity of the base station it is passing through. A specific method for virtualizing up to 255 eNodeBs towards an LTE core network, as well as the general use of a stateful proxy architecture in a virtualization node, is described in US20140133456, which has been incorporated by reference.

Figure 9:
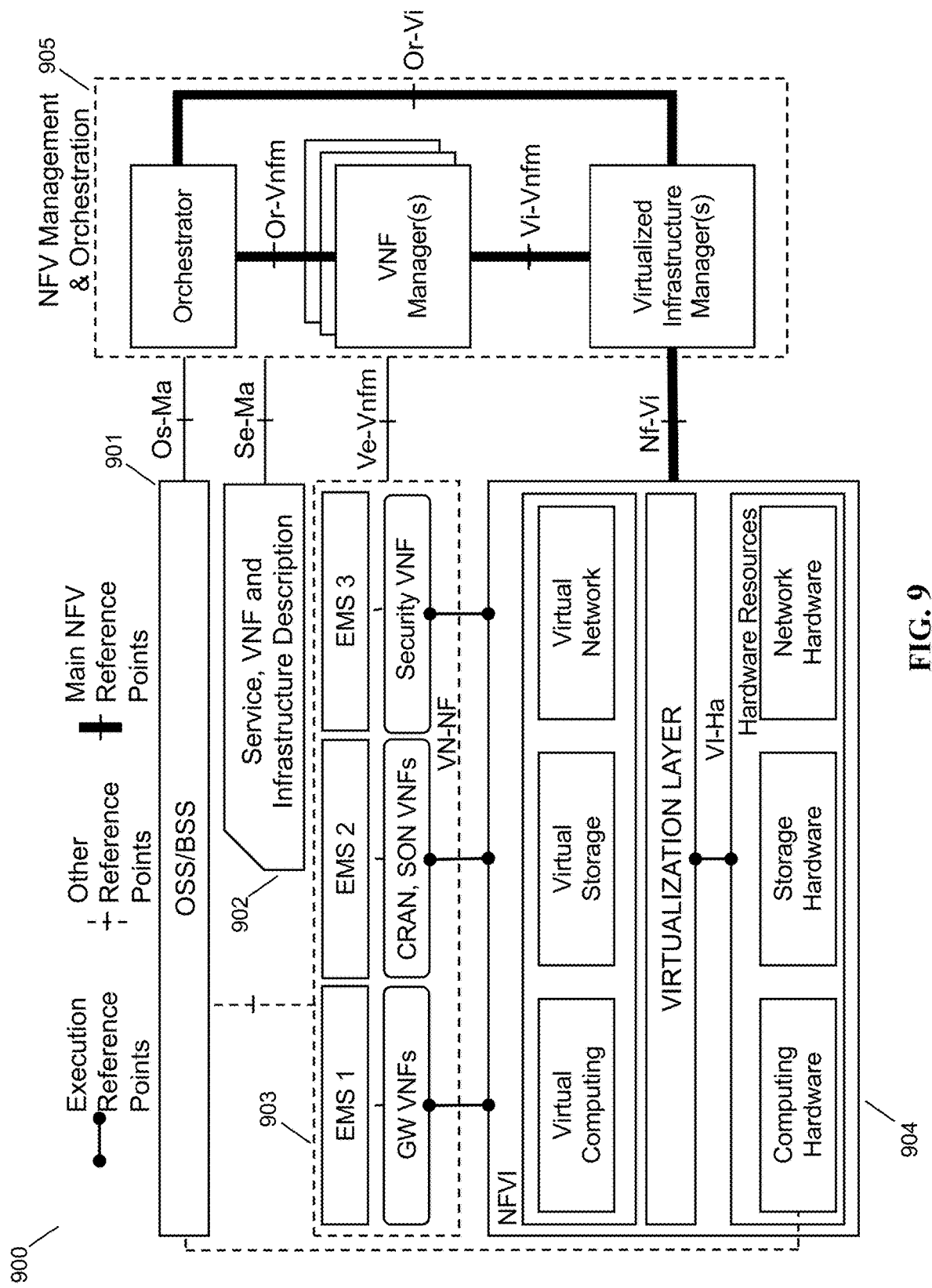
FIG. 9 is a schematic block diagram showing a network function virtualization architecture, in accordance with some embodiments.

In other instances, virtualization is used with an alternate meaning to mean isolation of software components from the underlying hardware, for example, with reference to FIG. 9. Implementation of virtual network functions (VNF) may be performed in such a manner, providing numerous advantages known to one of skill in the art.

In some embodiments, virtualization of radio access nodes may be performed over multiple radio access technologies (RATs). The methods described herein can be used to virtualize RAN nodes of multiple types toward a single core network, without necessarily requiring the core network to be adapted, by interworking the protocols and interfaces of the RAN to the protocols and interfaces of the core. As described herein, an operator may provide CDMA/EVDO network access by interworking the CDMA protocol at the RAN to LTE at the core. Either enhanced or non-standard RAN nodes, or third-party standard CDMA nodes, may be used in conjunction with an interworking proxy as described herein. Packet-switched and circuit-switched communications may both be proxied and virtualized, in some embodiments. Control plane and data plane communications may both be proxied and virtualized, in some embodiments. Virtualization of the CDMA circuit core may be performed at a first stage, and virtualization of the CDMA circuit core may be performed at a second stage.

In some embodiments, virtual network functions (VNFs) may be provided at the virtualizing network gateway. In particular, VNFs may be provided, either as processes, threads, containers, virtual machines, or other means of providing executable software. Single or multiple VNFs may be provided. VNFs may be intermixed with other types of executable software. VNFs may provide various features as described further below.

Figure 1:
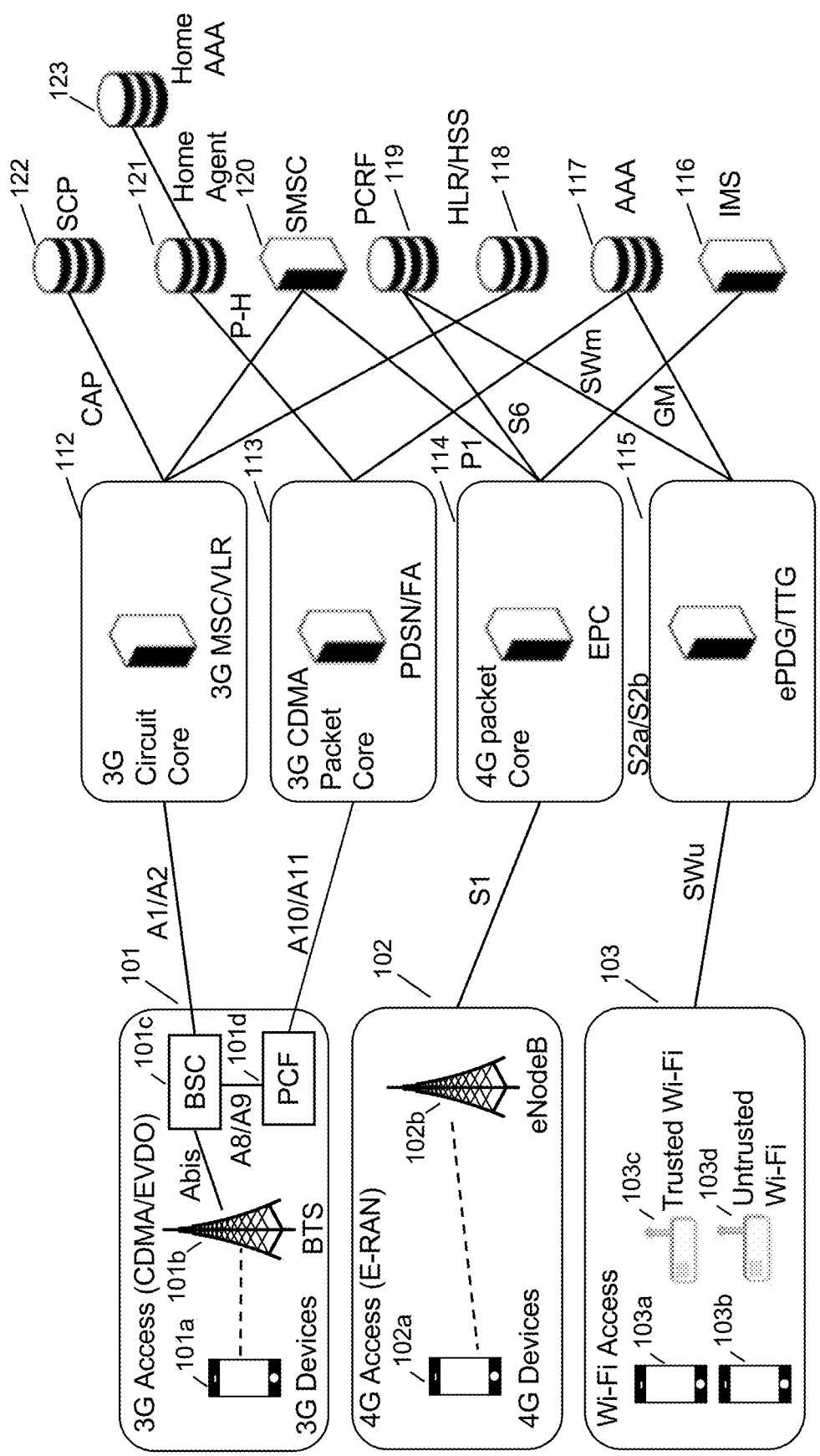
FIG. 1 is a schematic network architecture diagram for 3G and other-G prior art networks.

FIG. 1 is a schematic network architecture diagram for 3G and other-G prior art networks. A 3G access network (CDMA/EVDO) 101 is shown, including 3G devices 101a, CDMA base transceiver stations 101b, base station controller (BSC) 101c, and packet control function (PCF) 101d. 4G access network (LTE) 102 is shown, with 4G mobile devices (UEs) 102a and eNodeBs 102b. Additionally, a Wi-Fi access network 103 is shown, with Wi-Fi devices 103a, 103b, trusted Wi-Fi access gateway (TWAG) 103c, and untrusted Wi-Fi gateway 103d.

Each radio access technology (RAT) of these wireless access networks is connected to its own core network. CDMA access network 101 is coupled to 3G circuit core 112 via the A1/A2 interface and 3G packet core 113 via the A10/A11 interface. LTE access network 102 is coupled to LTE packet core (evolved packet core, or EPC) 114 via the S1 interface. Wi-Fi access network 103 is coupled to an evolved packet data gateway (EPDG) via the SWu interface, which provides a secure gateway into the core network of a telecom operator. Each network has its own appropriate protocols, standards, and messages.

Each core network is itself coupled to internal services provided by the network operator, such as SCP 122, home agent 121, home AAA 123, SMSC 120, PCRF 119, HLR/HSS 118, AAA 117, and IMS 116. While certain network services are used by multiple cores, such as authentication, authorization and accounting (AAA) server 117, most of these internal services are specific to one core network or another core network (e.g., the Internet Multimedia Subsystem, or IMS 116, is used by the LTE EPC 114), leading to redundancy and operator maintenance expense.

Figure 2:
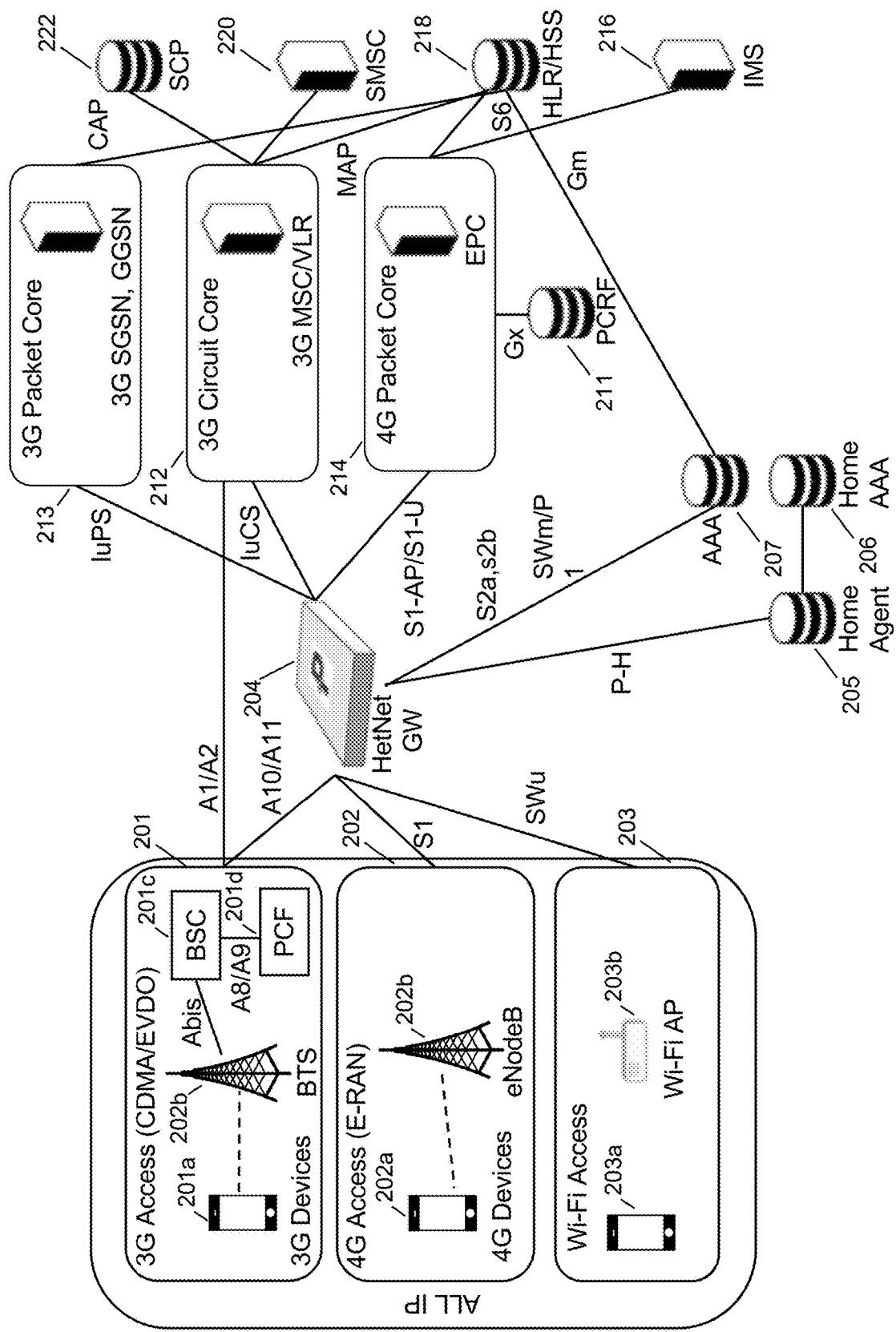
FIG. 2 is a first schematic network architecture diagram of a first network architecture, in accordance with some embodiments.

FIG. 2 is a first schematic network architecture diagram of a first network architecture, in accordance with some embodiments. 3G access network 201 (including devices 201a, BTS 202b, BSC 201c, and PCF 201d), 4G access network 202 (including UEs 202a and eNodeB 202b), and Wi-Fi access network 203 (including devices 203a and Wi-Fi AP 203b) are no longer operationally independent but instead share a single coordinating node, the Parallel Wireless HetNet Gateway [TM] 204. This HNG 204 provides virtualization of network nodes, interworking, self-organizing network functionality, and inter-RAT coordination, as follows. Noteworthy is that access networks 201, 202, 203 are modernized to use only Internet Protocol (IP) based architectures, which simplifies and reduces the cost of the access networks. This is a feature of the existing 3G, 4G, and Wi-Fi access networks that can be leveraged by the present disclosure, as any and all backhaul to the operator core networks can be using IP and standard Internet infrastructure (e.g., public Internet or private fiber, etc.).

In operation, the HNG provides gateway functionality for all communications for the 4G and Wi-Fi access networks, including signaling to 4G core 214. For the 3G access network, in this scenario the 3G access network uses the HNG 204 for all packet-switched communications to the 3G packet core 213 via the A10/A11 protocols, but not for circuit-switched communications, which are handled directly by the 3G circuit core 212. SCP 222, SMSC 220, HLR/HSS 218, IMS 216, PCRF 211, AAA 207, home agent 205, and home AAA 206 are still present in this first network architecture. This architecture supports both 3G circuit-switched fallback for the 4G network, via the IuCS connection to the 3G circuit core 212, as well as native 4G voice calling via Voice over LTE (VoLTE) and the IMS core 216. Virtualization of network nodes may or may not be performed for any or all of the access networks, in some embodiments. 3G (CDMA) access network 201 is handled much the same as a Universal Mobile Telecommunications System (UMTS) 3G access network, using a dedicated 3G core. In some embodiments, the 3G (CDMA) access network's communications are interworked to 3G (UMTS) communications, to enable the use of a single 3G core network for both UMTS and CDMA. This is done by interworking at the HNG 204. In some embodiments, packet-switched communications are interworked; in other embodiments, both packet- and circuit-switched communications (not shown) are interworked. HNG 204 uses 3G/CDMA home agent 205 and home AAA 206 to provide CDMA-native services, in some embodiments. For data path, the Parallel Wireless HetNet Gateway (HNG) may thus virtualize these call flows toward the RAN but would provide the underlying IP data connectivity directly over IP, meaning that the call flows would be reasonably similar to existing call flows at the RAN, but would involve direct IP traffic upstream from the HNG.

In some embodiments, a 3G SGSN and GGSN are provided by 3G packet core 213; a PDSN virtual function is provided at HNG 204, in some embodiments (as described further below). The A10/A11 interfaces are proxied using a stateful gateway and/or virtualized, providing a standard interface towards the PCF/BSC. The P1 interface towards the AAA server is also proxied and/or virtualized. The P-H interface towards the home agent/home AAA server are also proxied and/or virtualized. In some embodiments, the HA/FA/AAA servers may be specific to CDMA.

In some embodiments, handovers may be provided within RATs by proxying handover communications into the appropriate core network, e.g., for CDMA, the 3G circuit core. In some embodiments, inter-RAT handovers may be provided at the gateway 204, in a standards-compliant manner via the source core network and the target core network, or in a proxied and/or virtualized manner by proxying handover communications from one RAT into appropriate handover communications toward the core network of another RAT. In some embodiments, the gateway may be configured to provide one or more application-aware inter-radio access technology (inter-RAT) slices across CDMA, 3G, 4G, 5G, and wireless local area networking (WLAN) technologies, the inter-RAT slices being based on application-layer information gathered at the base station management gateway. These techniques and methods for handover and network slicing may apply to FIG. 2 and the first architecture, and to all other architectures described herein.

Figure 3:
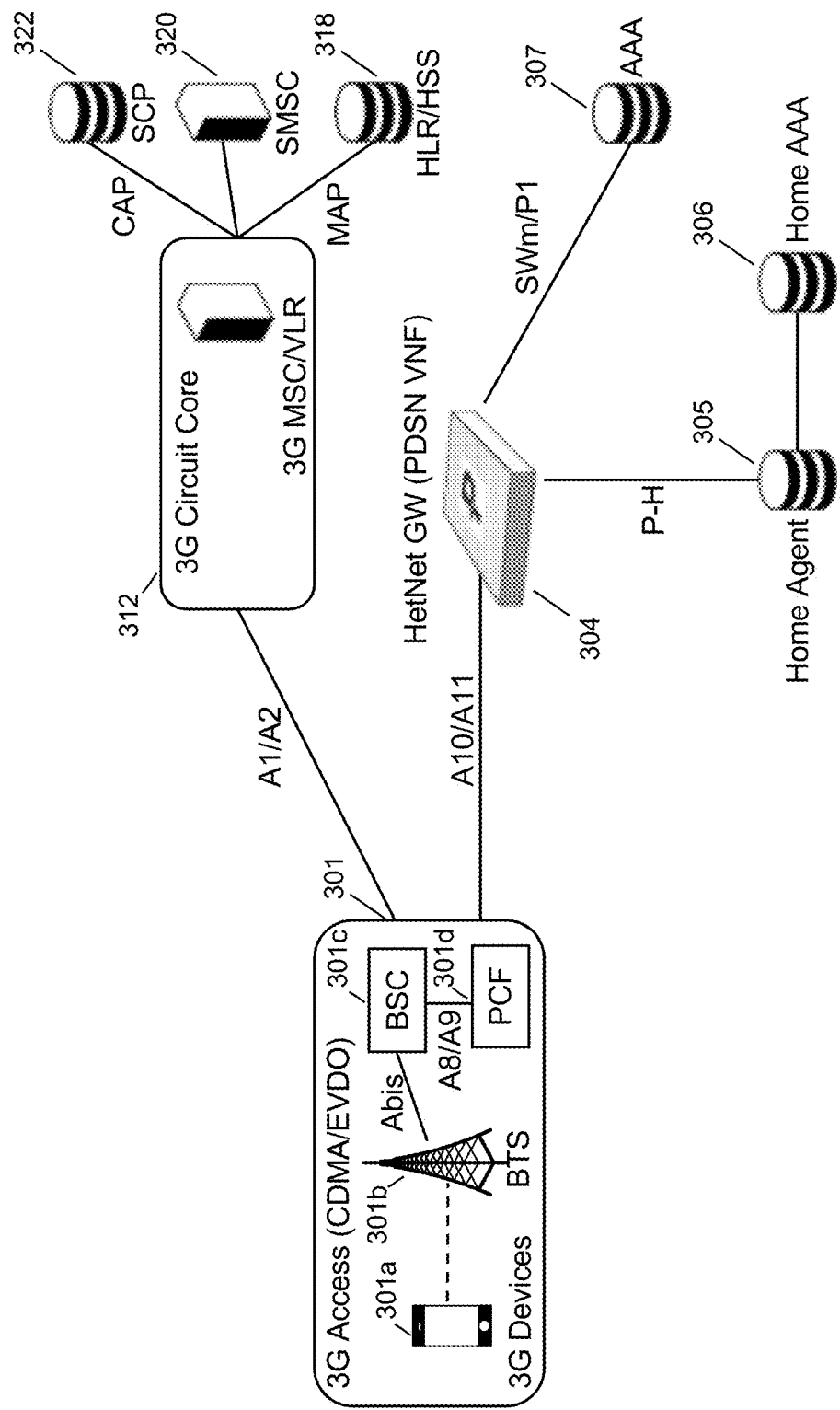
FIG. 3 is a second schematic network architecture diagram of the first network architecture, in accordance with some embodiments.

FIG. 3 is a second schematic network architecture diagram of the first network architecture, in accordance with some embodiments. The first network architecture enables interworking of CDMA to LTE, with respect to the packet virtualization. 3G access network 301 (including MS 301a, BTS 301b, BSC 301c, and PCF 301d) is in communication via A1/A2 with 3G circuit core 312, which includes a 3G MSC/VLR. 3G circuit core 312 relies upon SCP 322, SMSC 320, HLR/HSS 218. HNG 304 is in communication with 3G access network 103 via A10/A11. HNG 304 includes a PDSN VNF. The PDSN VNF operates to enable the 3G CDMA access network 301 to access the Internet and other networks using CDMA-standard protocols, and in particular, acts as the foreign agent (FA) in the context of CDMA mobile IP registration and provides termination of the point-to-point (PPP) data link with the mobile device. The PDSN at the HNG also provides IP routing and gatewaying. The PDSN VNF may be in a virtual machine, in some embodiments. Instead of communicating with the 3G circuit core, the PDSN VNF may directly provide access to one or more packet data networks and may provide billing, accounting, and tracking in conjunction with AAA 307. Circuit-switched connections may still be redirected to 3G circuit core 312. Instead of 3G or CDMA protocols, the HNG 304 is enabled to interwork A10/A11 to SWm/P1, so that the LTE operator core network can be used to provide services to the CDMA access network. As well, HNG 304 monitors state and sends appropriate communications to the 3G CDMA core network home agent 305 and home AAA 306 to, for example, register the HNG's network address as the mobile device's foreign IP address for purposes of providing CDMA-based mobility. HNG 304 provides stateful proxy functionality to enable the A10/A11 interworking and the P-H interworking.

In some embodiments, the PDSN VNF may: establish, maintain, and terminate PPP sessions with mobile stations; support simple and mobile IP services; act as mobile IP foreign agents for visiting mobile stations; handle authentication, authorization, and accounting (AAA) for mobile stations (including proxying and retaining AAA state at the VNF, and forwarding AAA state to AAA servers in the LTE core network or any other core network, and using the RADIUS protocol as appropriate); route packets between mobile stations and external packet data networks; and collect usage data and forward same to AAA servers. In some embodiments, the PDSN VNF may be at the HNG, and may be co-located with other gateway services, NAT services, proxying services, AAA services, LTE PGW proxy functions, and other functions or services. In some embodiments, accelerated packet forwarding may be enabled using hardware acceleration, for example, by using software APIs and middleware configured to take advantage of hardware acceleration.

Figure 4:
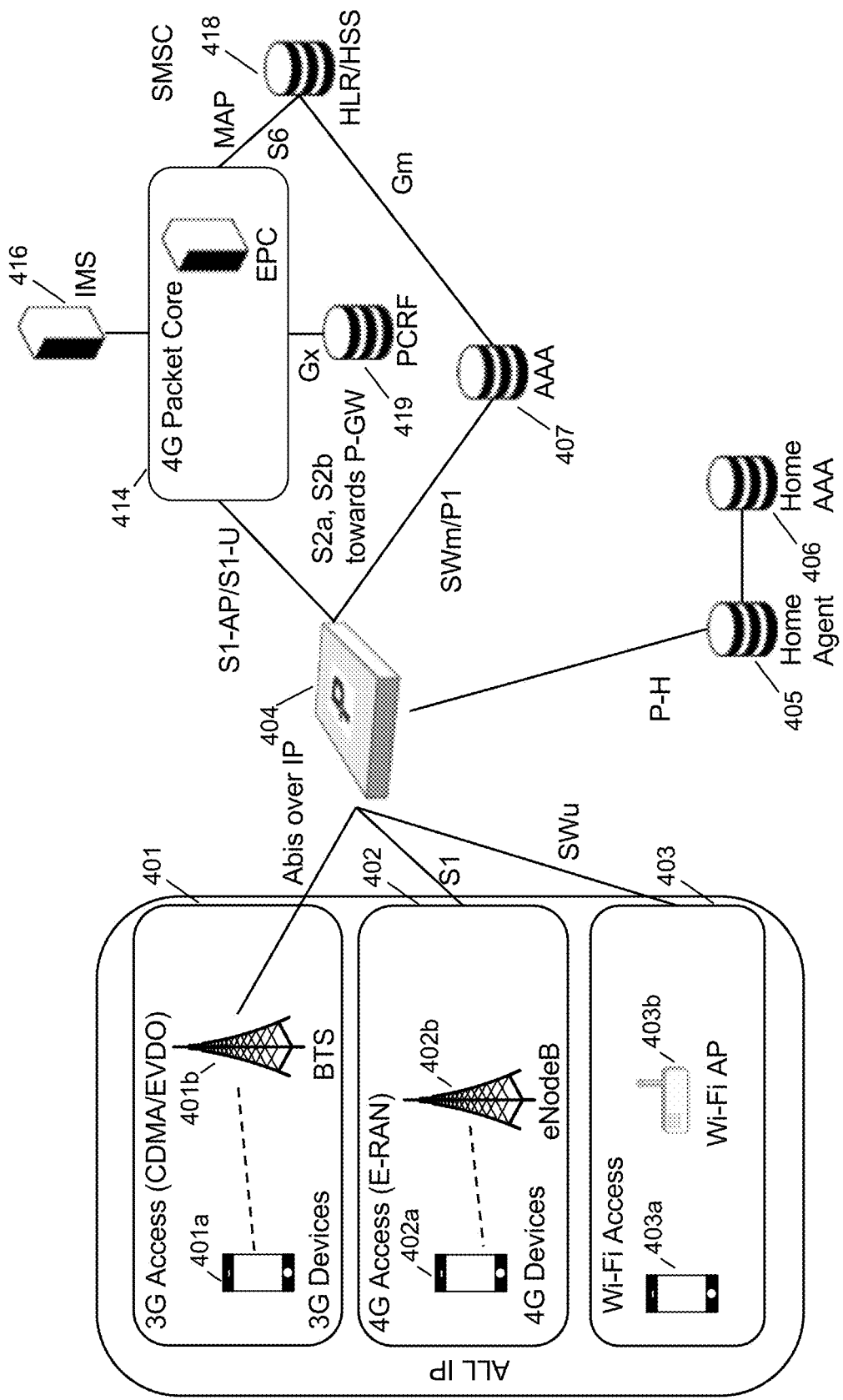
FIG. 4 is a first schematic network architecture diagram of a second network architecture, in accordance with some embodiments.

FIG. 4 is a first schematic network architecture diagram of a second network architecture, in accordance with some embodiments. The second network architecture enables interworking of both the circuit-switched and the packet-switched CDMA networks. CDMA access network 401 (including MSes 401a and BTS 401b), 4G/LTE access network 402 (including UEs 402a and eNodeB 402b), and Wi-Fi access network 403 (including devices 403a and AP 403b) are provided. All access networks are gatewayed by HNG 404, which is in communication with a 4G packet core 414, as well as AAA 407 and home agent 405, and indirectly through the AAA and home agent, home AAA 406 and HLR/HSS 418, and indirectly through 4G EPC 414, IMS core 416 and PCRF 419. S2a/S2b interfaces may be used towards the 4G packet core 514 for packet data connectivity and S1-AP/S1-U for signaling connectivity. Compared to HNG 204/304, HNG 404 subsumes BSC 201c/301c and PCF 201d/301d functions of the CDMA access network. These may be running as virtual network functions on the HNG 404, or in any other executable form, preferably in a form that is capable of being virtualized. To facilitate the use of these virtual network functions on HNG 404, an enhanced version of the Abis over IP interface is used to interoperate with BTS 401b. In some embodiments, the BTS 401b may be specially configured to interoperate with HNG 404 and may support special SON functions, network node virtualization, etc. In some embodiments, the BTS 401b may be a standard BTS. Whether the BTS is enhanced or not, the HNG 404 is enabled to live in a standard data center as a result of all the RANs using IP, including via the BTS's use of Abis over IP.

HNG 404 uses LTE-standard protocols, specifically, S1-AP/S1-U/S2a/S2b to talk to the EPC 414, instead of IuPS/IuCS, making a 3G core network no longer needed. SWm/P1 is used to communicate with AAA 407. The S1 and Swm protocols are interworked to and from CDMA protocols to enable interoperation, using the stateful proxy described herein. A VNF is used for the PDSN functionality, for interoperating with HA 405 and home AAA 406. Packet-switched communications are able to be interworked directly in this way.

In some embodiments, in the second network architecture, virtualization may be performed including a VNF of the BSC (IP-based); packet MSC; SIP proxy; and S2a/S2b interface towards the LTE EPC PGW. The BSC IP VNF may support Abis over IP; may support proprietary BTS interfaces depending on vendor; and may support A1p/A2p interfaces toward the MSC VNF (and may support these interfaces internally via interprocess communication, or local loopback network communication, or another method, or may omit unnecessary communication between co-located VNFs). The BSC IP VNF may support the 3GPP2 A.S0012-D v3.0 specification and the 3GPP2 A.S0003-A specification, each of which are hereby incorporated by reference in their entirety for all purposes.

In some embodiments, in the second network infrastructure, the packet MSC VNF may support A1p/A2p interfaces towards the BSC VNF and may support the 3GPP2 A.S0012-D v3.0 specification. In some embodiments, the packet MSC VNF may interact with the SIP proxy VNF and may support the interface towards the HLR/HSS.

In some embodiments, in the second network infrastructure, the SIP proxy VNF may act as a SIP UA on behalf of a mobile user; may support SIP signaling as well as media towards the IMS core; may support interworking between CDMA voice signaling/media interfaces and SIP signaling and media, including transcoding; may support S2a/S2b (GTP-based) interfaces towards the LTE EPC; and may also support appropriate security protocols (IPsec, IMS-AKA).

Figure 5:
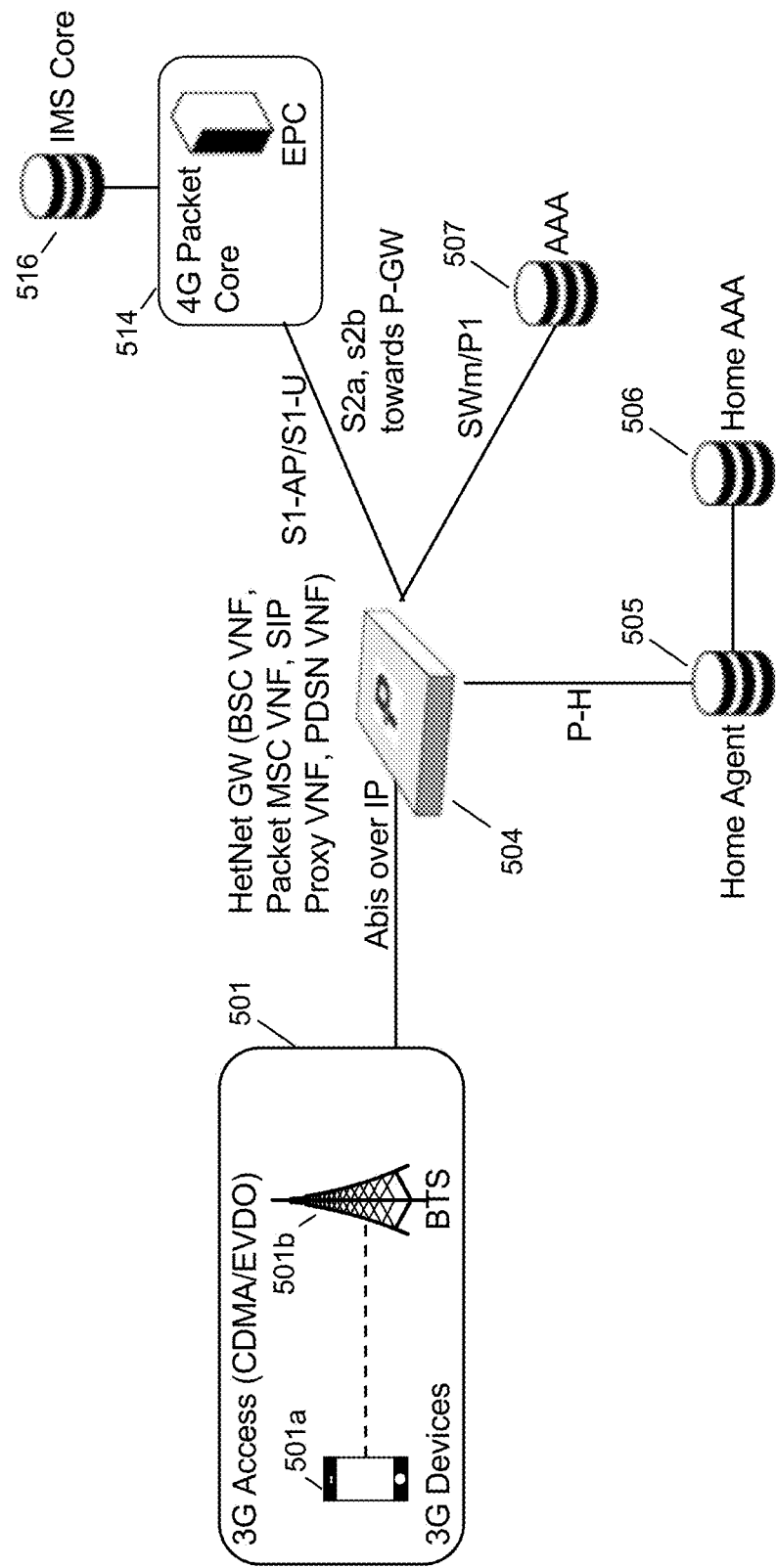
FIG. 5 is a second schematic network architecture diagram of the second network architecture, in accordance with some embodiments.

FIG. 5 is a second schematic network architecture diagram of the second network architecture, in accordance with some embodiments. Continuing on, for circuit-switched communications, 3G/CDMA access network (including devices 501a and BTS 501b) 501 is in communication with HNG 504 using Abis over IP. HNG 504 also includes a BSC IP VNF, a packet MSC VNF, a Session Initiation Proxy (SIP) proxy VNF, and a PDSN VNF. S2a/S2b interfaces may be used towards the 4G packet core 514 for packet data connectivity and S1-AP/S1-U for signaling connectivity. Since no circuit core is available, the 4G packet core 514 is used in conjunction with the SIP proxy. The SIP proxy is enabled to proxy calls to and from the mobile station 501a, and may include transcoding, such that an incoming call received via IMS core 516, which will be IP-based, is transcoded to the specific formats expected by the SS7-compliant, circuit-switched 3G access network 501. In some embodiments, comfort noise, DTMF tones, etc. may also be provided at gateway 504. Gateway 504 provides stateful proxying, interworking, and transcoding of any and all circuit-switched calls. In some embodiments, an high rate packet data (HRPD) serving gateway (HSGW) may also be present at gateway 504, and may be present as a VNF. The HSGW can talk to the PGW as a local mobility anchor (LMA) and may be used as a migration path to LTE, in some embodiments.

Figure 6:
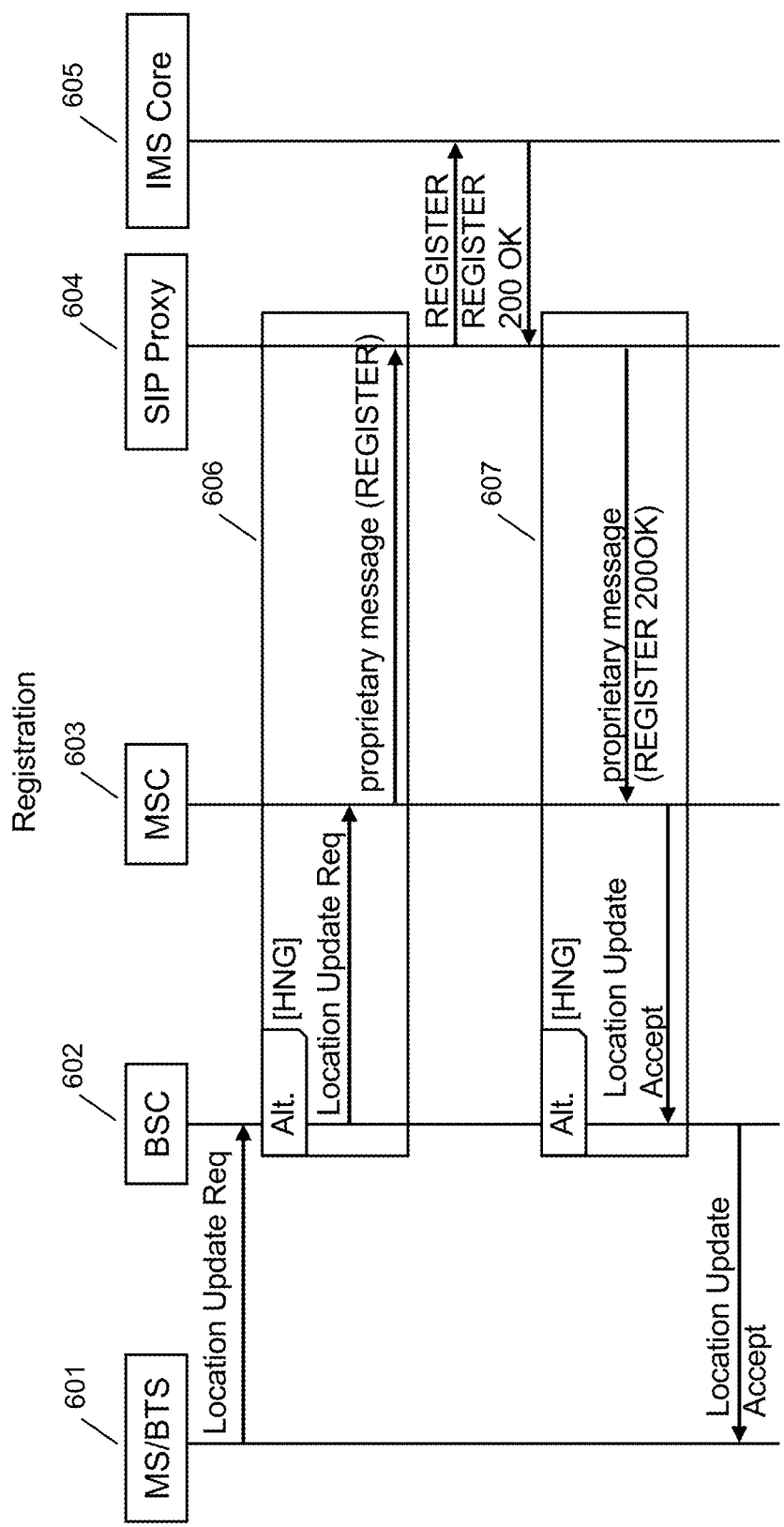
FIG. 6 is a signaling call flow showing registration of a mobile device, in accordance with some embodiments.

FIG. 6 is a signaling call flow showing registration of a mobile device, in accordance with some embodiments. MS/BTS 601, BSC 602, MSC 603, SIP proxy 604, and IMS core 605 are shown performing a registration process. BSC 602, MSC 603, and SIP proxy 604 are functions provided by an HNG as described herein. When a location update is sent by the mobile station, the BSC sends a message to the HNG, which interposes a proprietary message 606 via a SIP proxy 604 to register the MS at the SIP proxy. The SIP proxy performs registration at the IMS core. When the IMS core responds with an affirmative response, the HNG interworks the messages to a location update accept message, which is then sent to MS 601.

Figure 7:
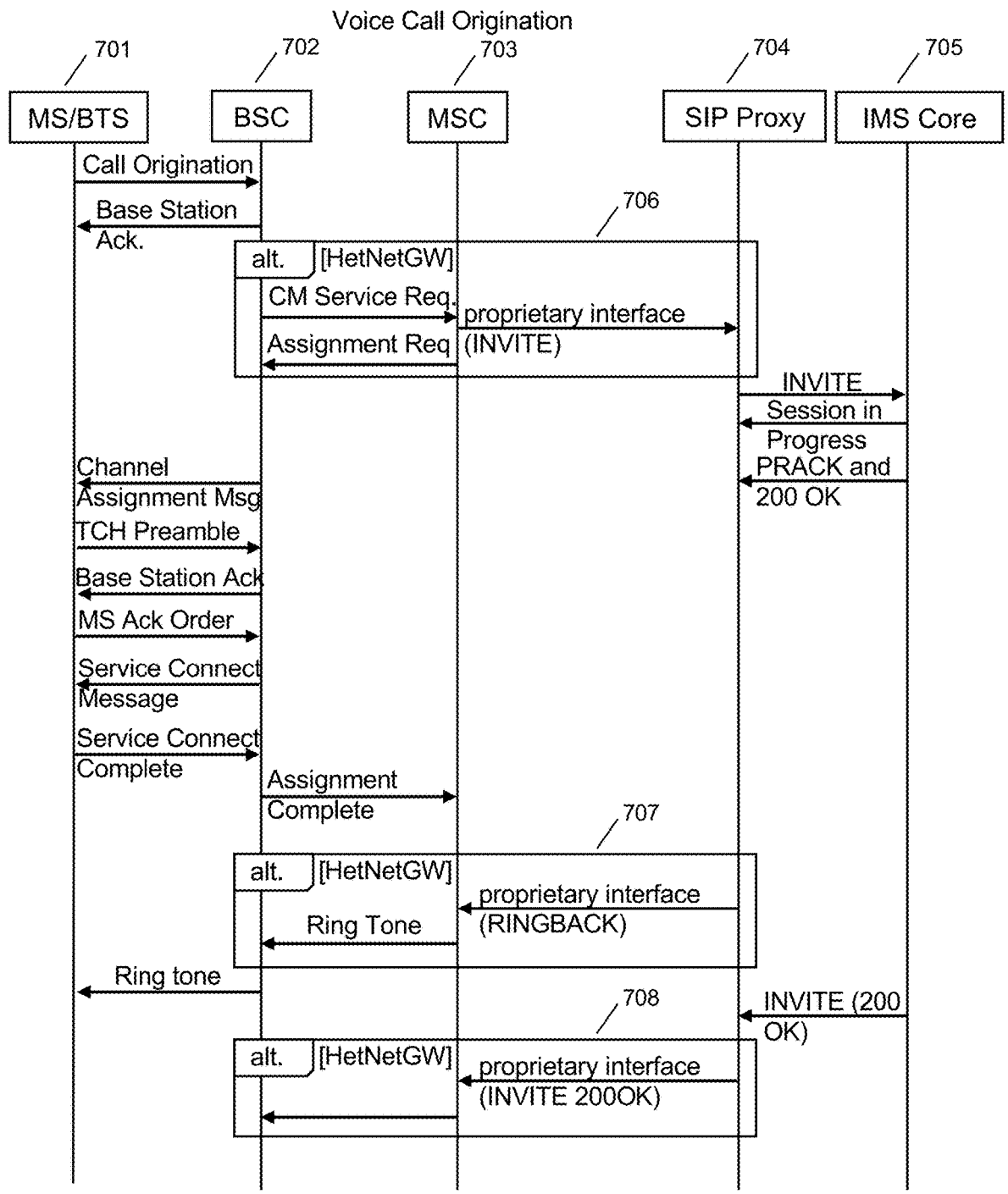
FIG. 7 is a signaling call flow showing voice call origination by a mobile device, in accordance with some embodiments.

FIG. 7 is a signaling call flow showing voice call origination by a mobile device, in accordance with some embodiments. MS/BTS 701, BSC 702, MSC 703, SIP proxy 704, and IMS core 705 are shown performing a voice call origination. BSC 702, MSC 703, and SIP proxy 704 are functions provided by an HNG as described herein. A call origination by the MS 701 sent to the HNG is intercepted and turned into an INVITE message at the SIP proxy 704. The SIP message is used to initiate the call at the IMS core 705. When the IMS invitation is registered at the IMS core, the HNG generates BSC messages to connect service at the MSC. At 707, a SIP ringback message is interworked to an appropriate BSC message, resulting in a ringtone. At 708, a SIP OK message is interworked to an appropriate BSC message to complete the call.

Figure 8:
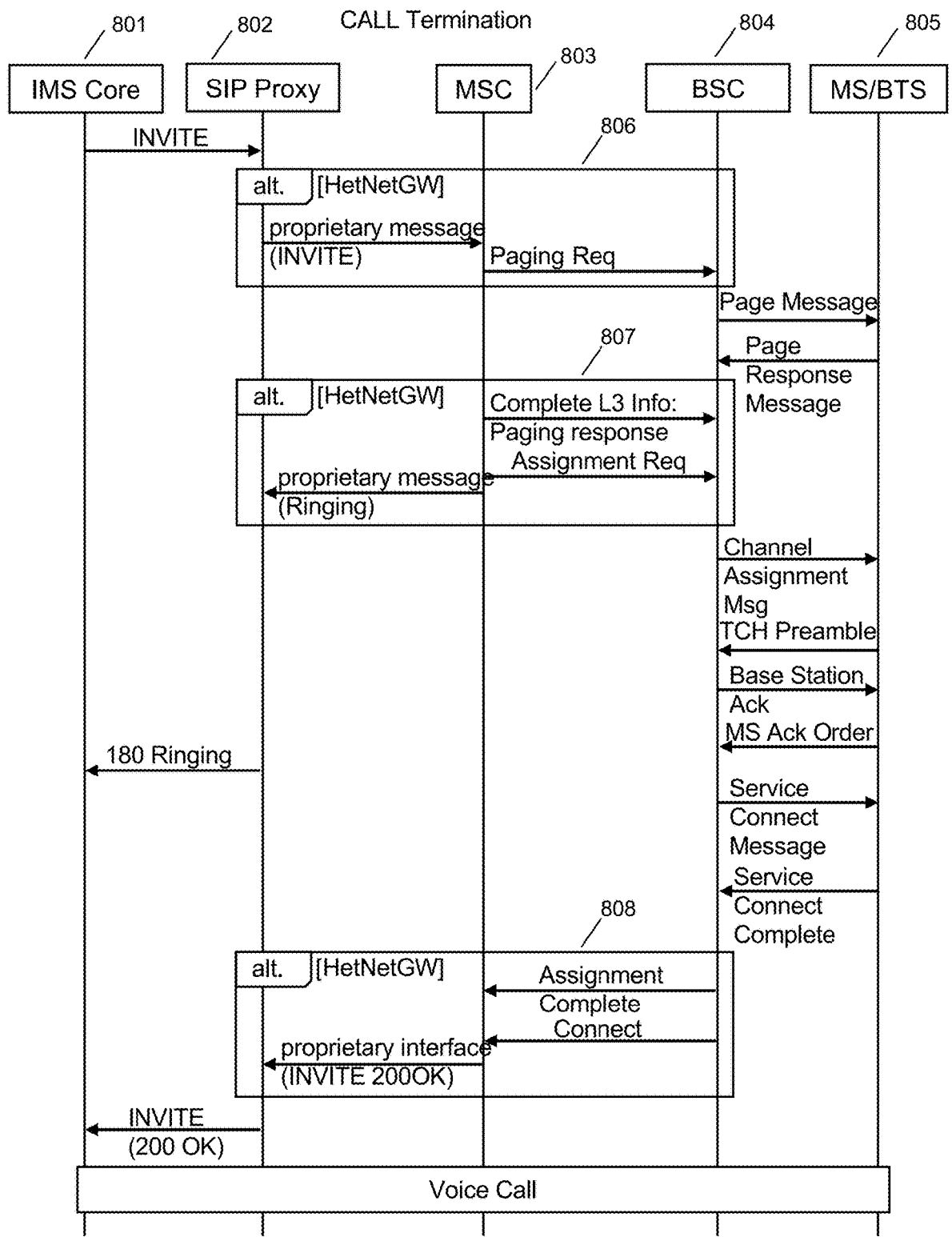
FIG. 8 is a signaling call flow showing voice call termination, in accordance with some embodiments.

FIG. 8 is a signaling call flow showing voice call termination, in accordance with some embodiments. MS/BTS 801, BSC 802, MSC 803, SIP proxy 804, and IMS core 805 are shown performing a voice call termination. BSC 802, MSC 803, and SIP proxy 804 are functions provided by an HNG as described herein. When the IMS core sends a SIP INVITE message to terminate a call at the mobile station, the SIP Proxy VNF 802 interworks the message to send a paging message 806 to the MS via the BTS. At 807, the MS responds, which is handled by the stateful proxy at the HNG, and the HNG generates a SIP RINGING message for the IMS core. Service is then connected by the stateful proxy at the HNG, including interworking and generation of tones, in some embodiments. At 808, the connection is completed via interworking from IMS/SIP to the enhanced Abis interface, and a voice call is initiated.

FIG. 9 is a schematic block diagram showing a network function virtualization architecture, in accordance with some embodiments. A network device 900 is shown with multiple network function virtualization instances. OSS/BSS management layer 901 is in communication with an orchestrator 905, which handles orchestration, VNF management, and virtualized infrastructure management. Each VNF includes a service, VNF and infrastructure description layer, which provides feedback to orchestrator 905. Instances 903 are instantiated as part of the virtualization layer, each with a component that speaks to an element management system (EMS), and with a component that provides different functions; a gateway VNF, a cloud RAN VNF, a self-organizing network (SON) VNF, and a security VNF are shown, but other VNFs are contemplated, including the PDSN VNF, SIP proxy VNF, etc. as described elsewhere herein. Each VNF is managed by the VNF manager. Each VNF is also coupled to a lower-layer NFVI layer, which provides virtual compute, storage, and networking, and through a virtualization layer, access to underlying hardware resources 904 that may be swapped out or extended at any time. The modules described herein and below with reference to FIG. 10 are intended to be implemented at the VNF layer as described herein, in some embodiments.

In some embodiments, a security VNF may be provided that is configured to: provide unified security across all RAN, VNFs+mesh; provide 3GPP-based standard IPsec; provide a security gateway for licensed and unlicensed access (Small Cell gateway TWAG/SaMOG, ePDG); provide secure authentication; and utilize virtualized fast path programming APIs to accelerate packet routing via hardware.

In some embodiments, gateway VNFs may be provided that provide: Super Cell/Virtual-eNB; CDMA EVDO PDSN; Enables 3G/4G/Wi-Fi real-time network SON; X2 Gateway; Small Cell gateway/HeNBGW; HNB Gateway/Virtual RNC; Security GW; Wi-Fi Controller/Gateway (TWAG, SaMOG, ePDG); Unlicensed Assist Backhaul (SDN); MEC; MOCN; IoT; Unified/not siloed for network elasticity, agility, and flexibility; Real-time multi-technology SON has visibility into 3G and 4G to make better decisions; RAN virtualization for 3G and 4G (vRNC and vHNB GW for 3G) and vHeNB GW+veNB for 4G; MEC works w/SDN+X2 and leverages scheduling to minimize latency (i.e. buffering in videos); and Virtualized fast path API usage, providing high performance routing. In some embodiments, C-RAN and SON VNFs may be provided that are configured to enable multi-technology (3G, 4G, Wi-Fi) C-RAN and SON.

Figure 10:
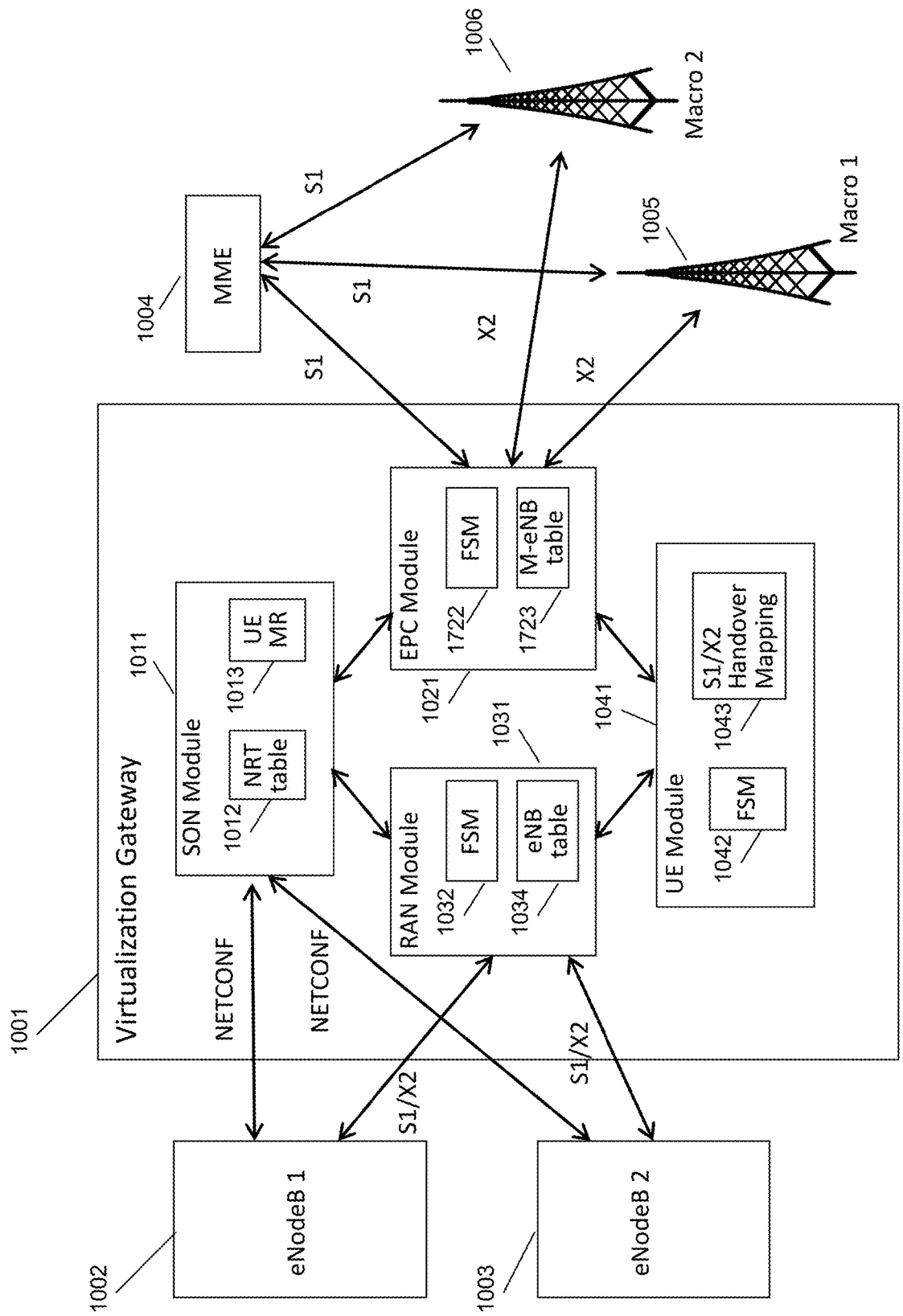
FIG. 10 is a schematic architecture diagram of an exemplary gateway, in accordance with some embodiments.

FIG. 10 is a schematic diagram of a virtualization gateway in a Long Term Evolution (LTE) architecture, in accordance with some embodiments. Virtualization gateway 1001 provides services to, and is coupled to, eNodeB 1 1002 and eNodeB 10 1003, on a RAN side of a network (i.e., inside of the gateway). Virtualization gateway 1001 provides services to, and is coupled to, MME 1004, macro eNodeB 1005, and macro eNodeB 1006, on a core network side of the network (outside of the gateway). Virtualization gateway 1001 corresponds to LAC 110, in some embodiments.

Within virtualization gateway 1001 are self-organizing network (SON) module 1011, containing neighbor relation table (NRT) 1012 and UE measurement report processing module 1013; evolved packet core (EPC) module 1021, containing EPC finite state machine module 1022 and macro eNodeB table 1023; radio access network (RAN) module 1031, containing eNodeB finite state machine module 1032 and eNodeB table 1034; and user equipment (UE) module 1041, containing UE finite state machine module 1042 and S1/X2 handover mapping table 1043. Each of modules 1011, 1021, 1031, and 1041 are coupled to each other within base station management gateway 1001, and may execute on one or more shared processors (not shown) coupled with memory (not shown).

In some embodiments, SON module 1011 may perform NRT maintenance, load information processing and fractional frequency reuse (FFR) processing; RAN module 1031 may perform X2 association management with eNodeBs 1002, 1003; EPC module 1021 may perform X2 association management with macro eNodeBs 1005, 1006; and UE module may perform X2 handover and S1/X2 translation between eNodeBs 1002, 1003 and macro eNodeBs 1005, 1006. All the above managers/modules interact with each other to accomplish the assigned functionality.

In some embodiments, virtualization gateway 1001 may include one or more of the following abstraction/automation/orchestration/aggregation/optimization functions, potentially as VNFs: Super Cell/Virtual-eNB; CDMA/EVDO PDSN; 3G/4G/Wi-Fi real-time network SON; X2 gateway; Small Cell gateway/HeNBGW; HNB Gateway/Virtual RNC; Wi-Fi Controller/Gateway (TWAG, SaMOG, ePDG); Security GW; Unlicensed Assist Backhaul (SDN); MEC; C-RAN.

Figure 11:
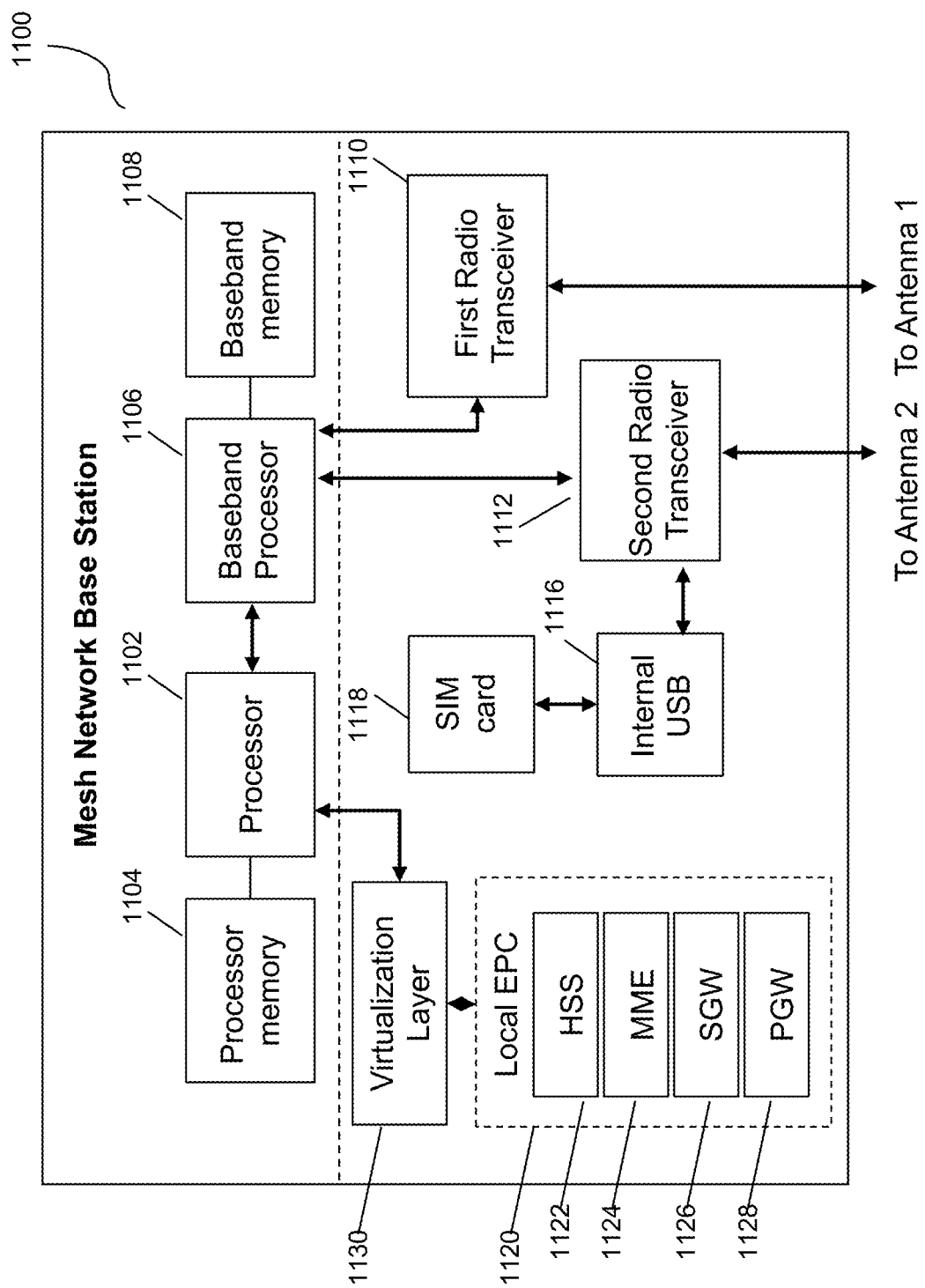
FIG. 11 is a schematic architecture diagram of an exemplary base station, in accordance with some embodiments.

FIG. 11 is a schematic diagram of a mesh network base station, in accordance with some embodiments. Mesh network base station 1100 may include processor 1102, processor memory 1104 in communication with the processor, baseband processor 1106, and baseband processor memory 1108 in communication with the baseband processor. Base station 1100 may also include first radio transceiver 1110 and second radio transceiver 1112, internal universal serial bus (USB) port 1116, and subscriber information module card (SIM card) 1118 coupled to USB port 1114. In some embodiments, the second radio transceiver 1112 itself may be coupled to USB port 1116, and communications from the baseband processor may be passed through USB port 1116.

A virtualization layer 1130 may also be included for mediating communications with an evolved packet core EPC, specifically including the core network EPC (not shown) and local evolved packet core (EPC) module 1120. Local EPC 1120 may be used for authenticating users and performing other EPC-dependent functions when no backhaul link is available. Local EPC 1120 may include local HSS 1122, local MME 1124, local SGW 1126, and local PGW 1128, as well as other modules. Local EPC 1120 may incorporate these modules as software modules, processes, or containers. Local EPC 1120 may alternatively incorporate these modules as a small number of monolithic software processes. Virtualization layer 1130 and local EPC 1120 may each run on processor 1102 or on another processor, or may be located within another device.

Processor 1102 and baseband processor 1106 are in communication with one another. Processor 1102 may perform routing functions, and may determine if/when a switch in network configuration is needed. Baseband processor 1106 may generate and receive radio signals for both radio transceivers 1110 and 1112, based on instructions from processor 1102. In some embodiments, processors 1102 and 1106 may be on the same physical logic board. In other embodiments, they may be on separate logic boards.

The first radio transceiver 1110 may be a radio transceiver capable of providing LTE eNodeB functionality, and may be capable of higher power and multi-channel OFDMA. The second radio transceiver 1112 may be a radio transceiver capable of providing 3GPP WCDMA functionality. Both transceivers 1110 and 1112 are capable of receiving and transmitting on one or more bands. In some embodiments, transceiver 1110 may be capable of providing both LTE eNodeB and LTE UE functionality, and transceiver 1112 may be capable of UMTS BTS functionality, UMTS UE functionality, or both. The transceivers may be switched. Transceiver 1110 may be coupled to processor 1102 via a Peripheral Component Interconnect-Express (PCI-E) bus, and/or via a daughtercard. As transceiver 1112 is for providing LTE UE functionality, in effect emulating a user equipment, it may be connected via the same or different PCI-E bus, or by a USB bus, and may also be coupled to SIM card 1118.

SIM card 1118 may provide information required for authenticating the simulated UE to the evolved packet core (EPC). When no access to an operator EPC is available, local EPC 1120 may be used, or another local EPC on the network may be used. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 1100 is not an ordinary UE but instead is a special UE for providing backhaul to device 1100.

Wired backhaul or wireless backhaul may be used. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 1110 and 1112, which may be Wi-Fi 802.11a/b/g/n/ac/ad/ah, Bluetooth, ZigBee, microwave (including line-of-sight microwave), or another wireless backhaul connection. Any of the wired and wireless connections may be used for either access or backhaul, according to identified network conditions and needs, and may be under the control of processor 1102 for reconfiguration.

Other elements and/or modules may also be included, such as a home eNodeB, a local gateway (LGW), a self-organizing network (SON) module, or another module. Additional radio amplifiers, radio transceivers and/or wired network connections may also be included.

Processor 1102 may identify the appropriate network configuration, and may perform routing of packets from one network interface to another accordingly. Processor 1102 may use memory 1104, in particular to store a routing table to be used for routing packets. Baseband processor 1106 may perform operations to generate the radio frequency signals for transmission or retransmission by both transceivers 1110 and 1112. Baseband processor 1106 may also perform operations to decode signals received by transceivers 1110 and 1112. Baseband processor 1106 may use memory 1108 to perform these tasks.

ALTERNATIVES

In some embodiments, services may be provided for both data and voice, for both control plane and user plane, for both circuit switched and packet switched services. Various versions of CDMA, such as cdmaOne, CDMA2000, EVDO, etc. service could also be provided, in some embodiments, in a similar fashion. In some embodiments, the MSC could be a self-contained module, an inter-dependent module within HNG, or a separate VM, for example. In some embodiments, multiple MSC virtualization may be provided by way of a VNF or module.

In some embodiments, the HNG, and any of the modules/VNFs thereon, as described throughout the present disclosure, may be in a virtual machine or may otherwise be enabled to be scalable, using load balancing, containerization, sharding, high availability, etc., with workloads divided by various factors, such as per RAN, per user, thresholded based on load, etc.

As will be understood by those skilled in the art, the present invention may be embodied in other specific forms without departing from the spirit or essential characteristics thereof. The methods may apply to LTE-compatible networks, to UMTS-compatible networks, 2G, 3G, 4G, 5G or other networks, networks that are combinations of multiple radio access technologies, or to networks for additional protocols that utilize radio frequency data transmission. With particular reference to 5G, interworking of UMTS or CDMA to interface with a 5G core network may also be supported, either in the case of 5G standalone or 5G non-standalone (i.e., 5G radio networks that are configured to leverage the LTE EPC), and interworking, stateful proxying, network node virtualization, etc. may be used to interwork to 5G-native protocols.

The methods may apply to a core network supporting devices connected via IP only (i.e., core only with no radio access network), or devices connected over Wi-Fi or another non-cellular access technology. Various hardware or software components in the devices described herein may be added, removed, or substituted with those having the same or similar functionality. Various steps as described in the figures and specification may be added or removed from the processes described herein, and the steps described may be performed in an alternative order, consistent with the spirit of the invention.

In the present disclosure, the words "NodeB" or "eNodeB" are used to refer to a cellular base station. However, one of skill in the art would appreciate that it would be possible to provide the same functionality and services to other types of base stations, specifically to BTSes, non-3GPP base stations, CDMA base stations, CDMA2000 base stations, Wi-Fi access points, and home eNodeBs (HeNodeBs), as well as any equivalents.

While the present disclosure uses the term "small cell," this term is used merely to illustrate the concepts herein, and nothing is implied regarding size, power level etc. for any cells that could be used with the disclosed systems and methods, i.e. "small cell" may be interpreted as including macro cells, femto cells, multi-radio access technology (RAT) access nodes, indoor cells, outdoor cells, etc.

Various alternative embodiments are also contemplated by the inventors. For example, certain functions may be performed at a multi-radio access technology node (multi-RAT) node, instead of at a base station management gateway. The base station management gateway may substantially take the form of the described Parallel Wireless HetNet Gateway. The base station management gateway may be a network node virtualization gateway, or a network function virtualization server, or both. The functions of the base station management gateway may be broken up and spread across multiple network nodes, or multiple software or hardware modules within the same network node, and may be physically located in a single location, or multiple locations. The network node may be in the data path located between the radio access network (RAN) and the core network, in some embodiments, or may be located at another location in the network. A high-bandwidth wired connection may be used for backhaul, such as coaxial cable, fiber optic cable, or Ethernet, or a reduced-bandwidth wireless connection, such as microwave, line-of-sight, or other physical connections may be used as backhaul.

The protocols described herein may be optimized for greater or lesser latency, for more or fewer mesh nodes, for more or fewer data streams, and other alternatives. In some embodiments, these optimizations may be performed at the eNodeB, at the base station management gateway, within a function performing radio resource allocation and coding selection, or at another location. In some embodiments, a base station management gateway may identify and initiate power adjustments to improve channel quality.

In some embodiments, the mesh network nodes may provide complete or partial guesses at what paths are the optimal or best paths during a particular time interval, and may be enabled to send messages back to the base station management gateway to communicate these complete or partial guesses.

In some embodiments, the base stations described herein may be compatible with a 3GPP UMTS or Long Term Evolution (LTE) radio transmission protocol or air interface. The LTE-compatible base stations may be eNodeBs. In addition to supporting the 3G WCDMA protocol, the base stations may also support other air interfaces, such as LTE, UMTS/HSPA, CDMA/CDMA2000, GSM/EDGE, GPRS, EVDO, other 3G/2G, legacy TDD, or other air interfaces used for mobile telephony. In some embodiments, the base stations described herein may support Wi-Fi air interfaces, which may include one of 802.11a/b/g/n/ac/ad/af/ah. In some embodiments, the base stations described herein may support 802.16 (WiMAX), or other air interfaces. In some embodiments, the base stations described herein may provide access to land mobile radio (LMR)-associated radio frequency bands. In some embodiments, the base stations described herein may also support more than one of the above radio frequency protocols, and may also support transmit power adjustments for some or all of the radio frequency protocols supported.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, or to networks for additional protocols that utilize radio frequency data transmission. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Accordingly, the disclosure of the present invention is intended to be illustrative of, but not limiting of, the scope of the invention, which is specified in the following claims.

The invention claimed is:

1. A system, comprising:
 a base station management gateway situated between a code division multiple access (CDMA) base transceiver station (BTS) and an Evolved Packet Core (EPC) core network, the base station management gateway also situated between an additional base station and the EPC core network, the base station management gateway further comprising:
  a stateful interworking proxy gateway configured to perform interworking of CDMA signaling to Evolved Universal Mobile Telecommunications System Terrestrial Radio Access (EUTRAN) signaling by using an S2a/S2b interface toward the EPC and an A10/A11 interface towards the CDMA BTS; and
  a packet routing virtual function further comprising a packet data serving node (PDSN) interface to the CDMA BTS, and further comprising a routing function for mobile devices attached to the additional base station to obtain IP connectivity via the EPC core network, the packet routing virtual function in communication with the stateful interworking proxy,
 wherein the stateful interworking proxy and the packet routing virtual function are configured to interwork CDMA protocols to Long Term Evolution (LTE) protocols for communicating with and requesting resources from the EPC core network;
 wherein the base station management gateway further comprises a Session Initiation Protocol (SIP) proxy for connecting SIP protocol voice connections;
 and
 wherein the SIP proxy acts as a SIP user agent (UA) on behalf of mobile users, performs SIP signaling towards an IP Mobility Subsystem (IMS) core network within the EPC core network, and performs interworking between CDMA and SIP signaling protocols.

2. The system of claim 1, wherein CDMA is one or more of cdmaOne/IS-95, cdma2000, evolution data optimized (EVDO), evolution data and voice (EVDV), or Ultra Mobile Broadband.

3. The system of claim 1, wherein the base station management gateway is further configured to communicate via a P1 interface towards an authentication, authorization, and accounting (AAA) server, and a P-H interface toward a home agent or home AAA server, on behalf of the mobile devices attached to the CDMA BTS.

4. The system of claim 1, wherein the packet routing virtual function is configured to terminate point-to-point (PPP) sessions with mobile devices attached to the CDMA BTS.

5. The system of claim 1, wherein the packet routing virtual function is configured to act as a mobile IP foreign agent for mobile devices attached to the CDMA BTS.

6. The system of claim 1, wherein the base station management gateway is configured to interact with the additional base station as a home nodeB gateway (HNBGW).

7. The system of claim 1, wherein the base station management gateway is configured to terminate an encrypted connection with a CDMA mobile device, thereby providing a secure anchor point for the CDMA mobile device for connection to the EPC core network.

8. The system of claim 1, wherein the base station management gateway is a virtualization gateway providing virtualization by using a single identifier towards the EPC core network for a plurality of eNodeBs, home NodeBs, or CDMA BTSes.

9. The system of claim 1, wherein the base station management gateway is configured to perform inter-radio access technology steering of a session from a first radio access technology (RAT) to a second RAT, the first RAT being CDMA and the second RAT being one of 2G, 3G, 4G, 5G, and wireless local area networking (WLAN), the technology steering directed by the stateful interworking proxy.

10. The system of claim 1, wherein the base station management gateway is configured to provide one or more application-aware inter-radio access technology (inter-RAT) slices across CDMA, 3G, 4G, 5G, and wireless local area networking (WLAN) technologies, the inter-RAT slices being based on application-layer information gathered at the base station management gateway.

11. The system of claim 1, wherein the base station management gateway is configured to provide handovers between the CDMA BTS and one or more of a 2G base station, a 3G base station, a 4G base station, a 5G base station, and a Wi-Fi access point.

12. The system of claim 1, wherein the base station management gateway further comprises a base station controller (BSC) and packet mobile switching center (MSC) virtual function.

* * * * *